D. J. CUMMINGS.
TRAFFIC SIGNAL.
APPLICATION FILED AUG. 30, 1916.
1,252,244.
Patented Jan. 1, 1918.
2 SHEETS—SHEET 1.
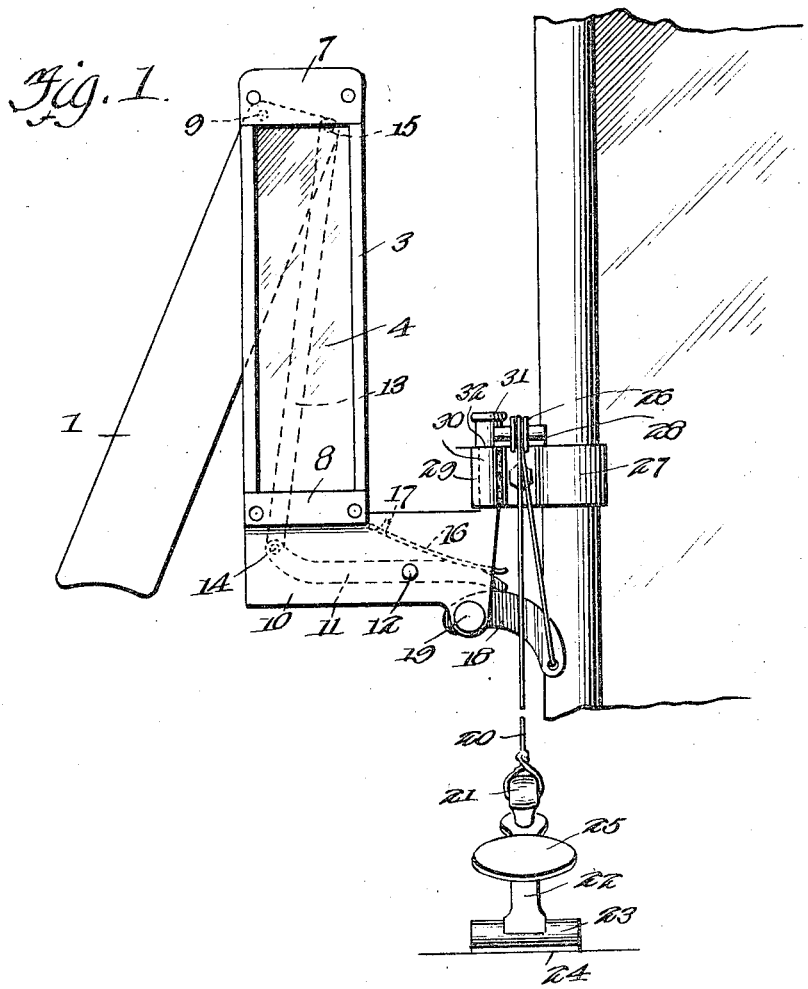
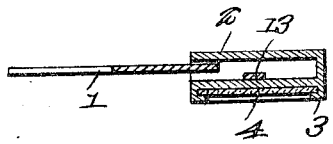
Witnesses
Hugh H. Ott
R. M. Smith
Inventor
D. J. Cummings,
By Victor J. Evans
Attorney D. J. CUMMINGS.
TRAFFIC SIGNAL.
APPLICATION FILED AUG. 30, 1916.
1,252,244.
Patented Jan. 1, 1918.
2 SHEETS—SHEET 2.
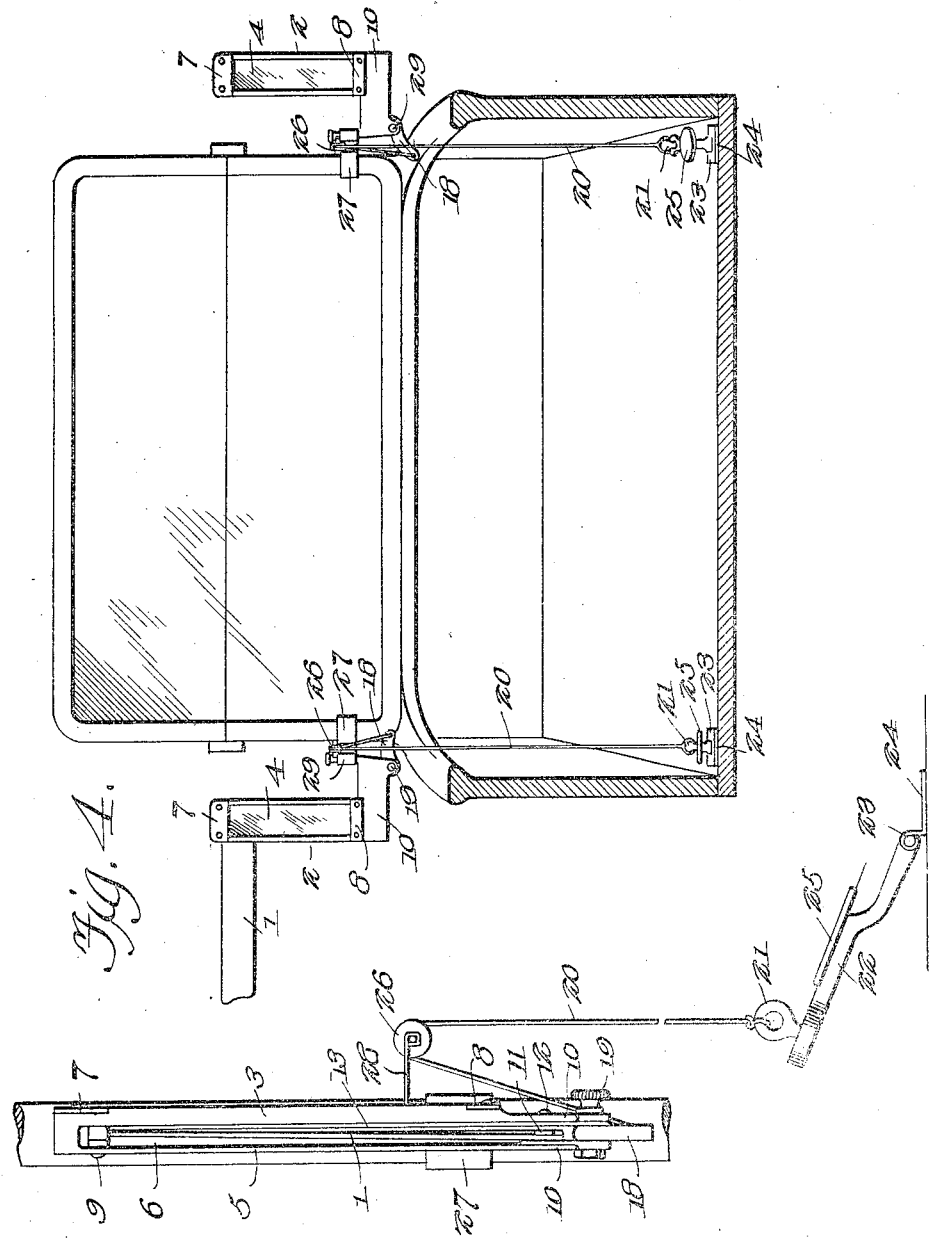
Witnesses
Hugh H. Ott
P. M. Smith
Inventor
D. J. Cummings,
By Victor J. Evans
Attorney

UNITED STATES PATENT OFFICE.

DANIEL J. CUMMINGS, OF NEW HAVEN, CONNECTICUT, ASSIGNOR OF ONE-THIRD TO PHILANDO S. ARMSTRONG, OF WESTVILLE, CONNECTICUT, AND ONE-THIRD TO EDWARD GOUIN, OF NEW HAVEN, CONNECTICUT.

TRAFFIC-SIGNAL.

1,252,244.          Specification of Letters Patent.          Patented Jan. 1, 1918.

Application filed August 30, 1916. Serial No. 117,742.

*To all whom it may concern:*

Be it known that I, DANIEL J. CUMMINGS, a citizen of the United States, residing at New Haven, in the county of New Haven and State of Connecticut, have invented new and useful Improvements in Traffic-Signals, of which the following is a specification.

This invention relates to traffic signals the object in view being to provide simple signaling apparatus adapted to be mounted upon a motor vehicle and to be controlled by the operator of the machine, for the purpose of notifying traffic policemen, pedestrians and drivers of other vehicles as to the direction in which the driver intends to turn the machine.

One of the chief objects of the invention is to produce a signal of the character referred to, which as a whole, is adapted to be readily mounted upon the wind shield or dash of a motor vehicle, combined with foot controlled means for operating the signal proper, and also means whereby the signal casing may be adjusted into any desired angular relation to the wind shield and the driver of the machine so that the mirrored face of the casing will reflect other machines and the like in rear of the machine equipped with the signaling apparatus.

With the above and other objects in view, the invention consists in the novel construction, combination and arrangement, herein fully described, illustrated and claimed.

In the accompanying drawings:

Figure 1 is a rear elevation of a traffic signal embodying the present invention and showing the same in its applied relation to the wind shield of a motor vehicle.

Fig. 2 is a side or edge view of the same showing the operating pedal and connections between the same and the signal.

Fig. 3 is a cross section through the signal proper and the casing in which the signal is normally housed.

Fig. 4 is a rear elevation on a reduced scale, showing two of the signals as applied to a wind shield under the preferred embodiment of this invention, together with the operating means therefor.

Referring to the drawings, 1 designates the signal proper which is shown in the form of an arm adapted to hang by gravity in a suitable casing or housing 2, which is sufficiently larger than the arm 1 to entirely conceal and receive the latter in its non-signaling position.

The casing 2 comprises a rearwardly facing wall 3 which has a large central opening and is rabbeted to receive a mirror or reflector 4 so that the driver may see other vehicles or pedestrians in rear of the machine he is operating. The casing also comprises another wall 5 arranged in spaced relation to the wall 3 and leaving a vertically elongated compartment or a space 6 in which the signaling arm 1 is received and from which it is adapted to be projected to a substantially horizontal position for signaling purposes as shown in the drawings. The mirror or reflector 4 is shown as secured in place by top and bottom retaining members 7 and 8.

The signaling arm 1 is swung on a pivot 9 adjacent to the upper end of the compartment in which said arm is located. The pivot 9 is located near the outer upper corner of the signal arm in order that the latter may hang pending within the casing when the operating means are released. The casing or housing containing the signal arm is supported by a base comprising plates 10 arranged in spaced relation to each other and having pivotally mounted between them a two arm lever 11, the same being fulcrumed between its ends on a pivot 12 connecting the plates 10. A link 13 is connected by a pivot 14 to one arm of the lever 11 and said link is connected at its opposite end by a pivot 15 to the top inner corner of the signaling arm 1. Coöperating with the other arm of the lever 11 is a spring 16 which is contained between the plates 10 and is fastened at the point 17 between said plates. The spring 16 presses the adjacent end of the lever 11 downwardly and lifts the other arm of the lever thereby thrusting upwardly on the link 13 and causing the signaling arm 1 to be retracted to its housed position within the casing.

18 designates a cam lever which is mounted on a pivot 19 between the plates 10. A flexible connection 20 is attached at one end to the free end of the cam lever 18 and is attached at its opposite end to an eye or lug 21 on the free end of a pedal or foot lever 22. The lever 22 is connected by a hinge pin 23 to an attaching or floor plate 24 fastened to the floor of the vehicle within reach of the operator. A foot plate 25 is carried by the lever 22 to receive the foot of the operator who by pressing downwardly on the lever 22 may rock the cam lever 18 and thereby rock the lever 11 for the purpose of projecting the signaling arm 1 from its casing. The flexible connection 20 passes around a guide pulley 26 journaled in a bracket 27 fastened to the wind shield or dash. The pulley 26 is off-set from the plane of the wind shield by an arm 28 of the bracket 27, the pulley 26 being journaled in the extremity of said arm which is forked to receive said pulley.

The bracket 27, in addition to the arm 28 is provided with a vertically disposed bearing sleeve 29 to receive a vertical journal 30 extending upwardly from the plates 10 hereinabove described and as indicated in Fig. 1, the journal 30 being enlarged to form a head 31 and a shoulder 32 which rests upon the top edge of the bearing sleeve 29. The construction just described enables the signal casing to be disposed at any angle to the wind shield necessary to enable the operator by looking at the mirror or reflector 4 to observe traffic conditions in rear of his machine.

It will of course be understood that it is proposed to use two of such signals and to arrange them one at each side of the wind shield in order that the operator of the car may display the proper signal to indicate whether he is about to turn to the right or to the left, and also that a separate and independent pedal lever 22 may be used as the primary actuating element of each signal. The signal may be given any desired color preferably red so as to attract the attention of others both in front and in rear of the machine.

I claim:

1. In a traffic signal for vehicles, the combination of a movable signaling member, a housing therefor adapted to conceal the signaling member when not in use, and also adapted to support a reflector, supporting means for said housing having a bearing portion in which an extension of the housing is journaled on a substantially vertical axis, manually controlled means for projecting said signaling member to signaling position, said operating means embodying a manually controlled cam lever having a pivotal relation to said housing, a two armed lever arranged to be actuated by said cam lever, and a link interposed between said two armed lever and the signaling member.

2. In signaling apparatus for motor vehicles, the combination with a vertical support such as a wind shield, of a bracket fixedly secured thereto and provided with a substantially vertical bearing sleeve, a guide roller supported by said bracket, a signaling arm, a casing in which said arm is concealed when not in use, said casing having an extension formed with a journal adapted to turn within said bearing sleeve, a cam lever mounted on a pivot having a fixed relation to said casing, operating connections between said cam lever and signaling arm, a manually controlled lever, and a flexible connection passing over said guide pulley and having one end attached to the manually controlled lever and the other end attached to said cam lever.

In testimony whereof I affix my signature.

DANIEL J. CUMMINGS.